No. 778,705. PATENTED DEC. 27, 1904.
V. W. RADCLIFF.
AUTOMATIC GATE.
APPLICATION FILED JULY 8, 1904.
2 SHEETS—SHEET 1.
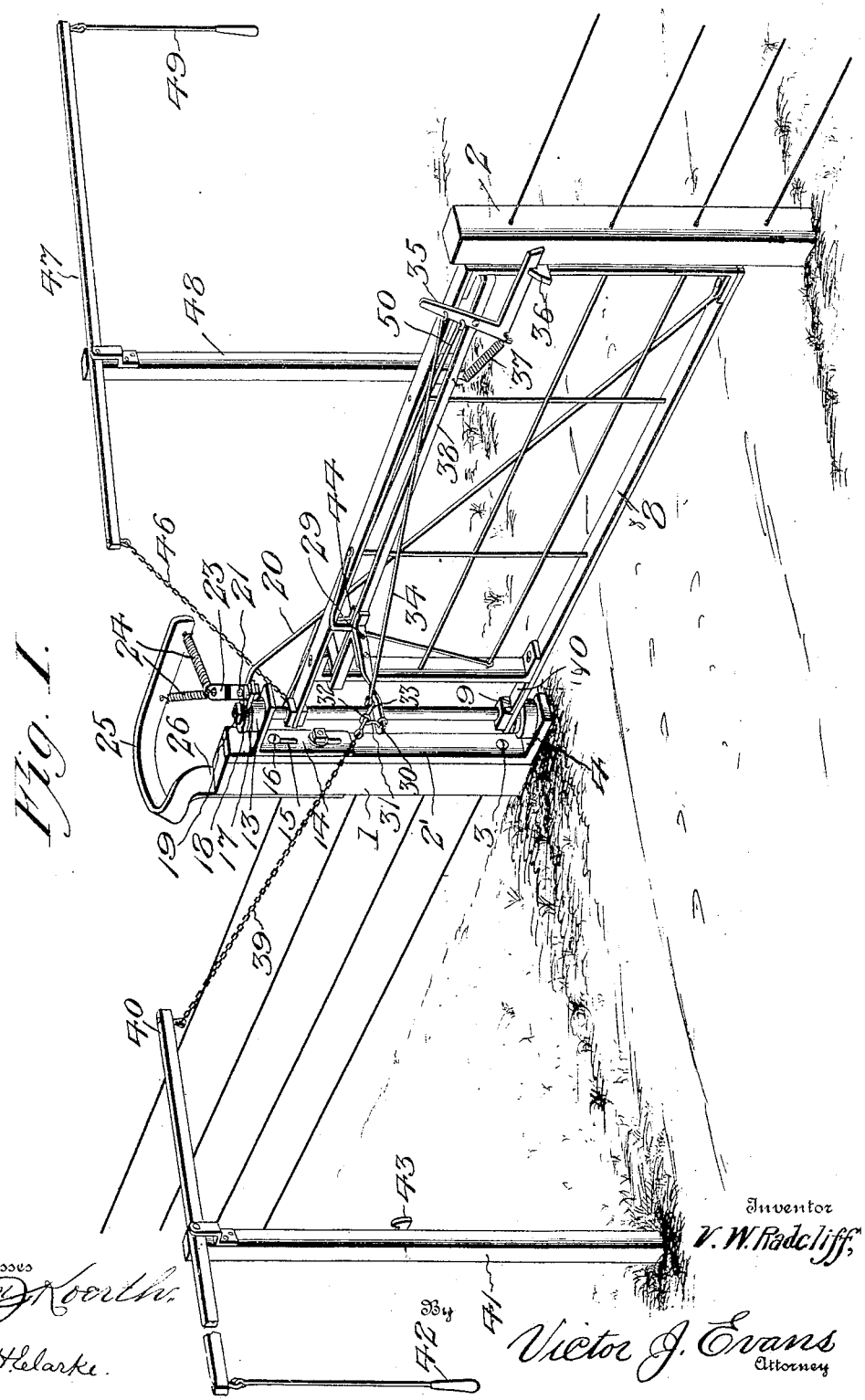

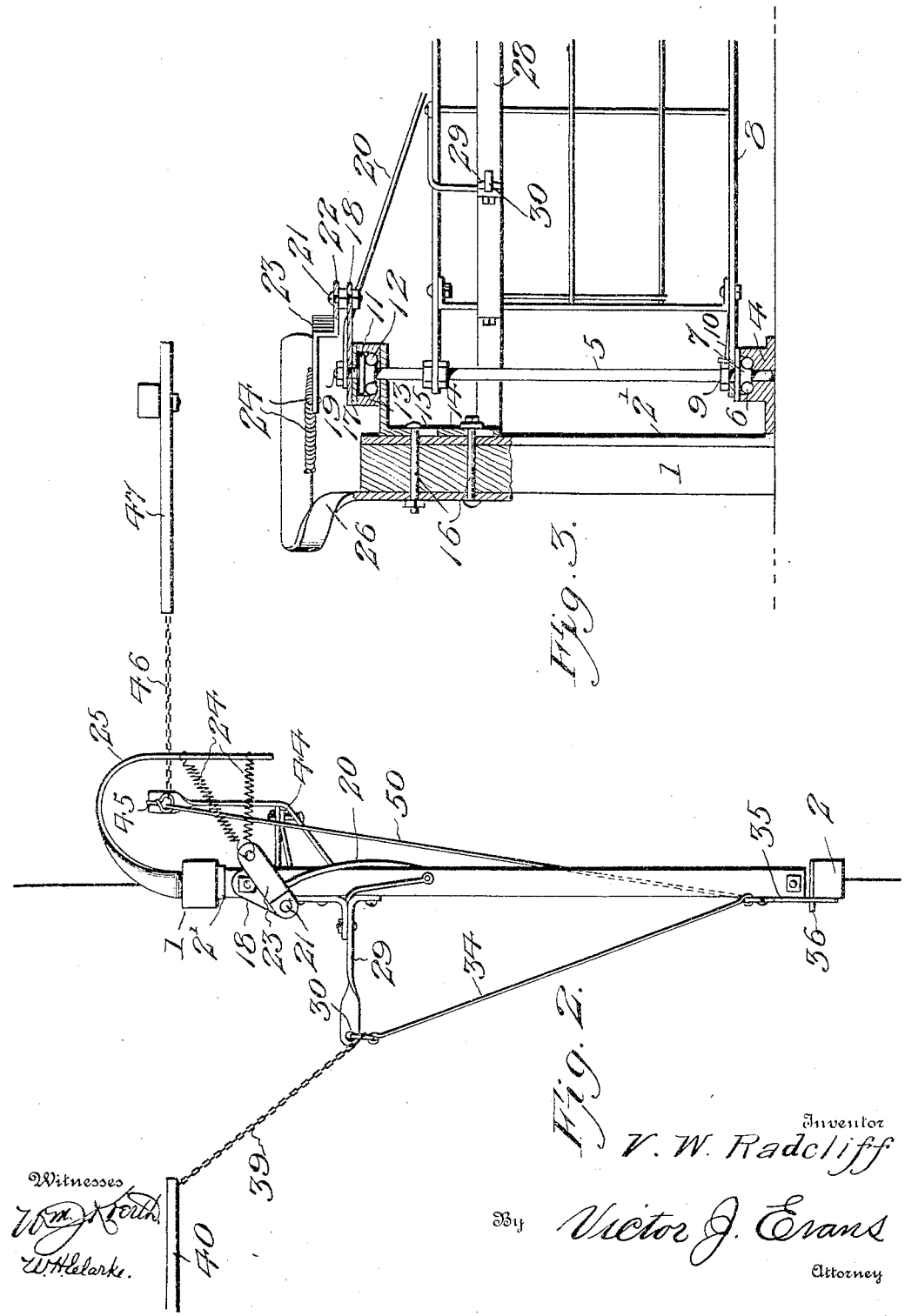

No. 778,705. Patented December 27, 1904.

UNITED STATES PATENT OFFICE.

VANNY W. RADCLIFF, OF NORTH ALTON, ILLINOIS.

AUTOMATIC GATE.

SPECIFICATION forming part of Letters Patent No. 778,705, dated December 27, 1904.

Application filed July 8, 1904. Serial No. 215,735.

*To all whom it may concern:*

Be it known that I, VANNY W. RADCLIFF, a citizen of the United States, residing at North Alton, in the county of Madison and State of Illinois, have invented new and useful Improvements in Automatic Gates, of which the following is a specification.

This invention relates to gates which are adapted to be automatically opened and closed.

The objects of the invention are to improve and simplify the construction of such devices.

With these and other objects in view the invention resides in the novel combination and arrangement of parts and the details of construction hereinafter described and claimed as a practical embodiment of the invention.

In the accompanying drawings, forming a part of this specification, Figure 1 is a perspective view of a gate constructed in accordance with the invention. Fig. 2 is a plan view thereof. Fig. 3 is a side elevation partly in section.

Like characters of reference indicate corresponding parts on the different views.

The numerals 1 and 2 designate the gate-posts, which may be of any desired form and construction. Fastened to the gate-post 1 is a strip 2' of metal or other suitable material, said strip being attached to the post 1 by bolts, such as 3. At its lower end the strip 2' is bent to form a socket-piece 4, in which is stepped the lower end of the gate pivot member 5. Seated in the socket-piece 4 is a series of antifriction-balls 6, upon which rests a collar 7, fastened to the gate pivot member 5, the collar 7 preferably having the shape of an inverted cone. The bottom bar 8 of the gate is formed with an eye which surrounds the pivot member or bar 5 and is held rigidly thereon by means of a nut 9, a suitable nut-lock 10 being fastened in any desired manner from the bottom bar of the gate to prevent accidental displacement of said nut. The upper end of the gate pivot member 5 is provided with a conical collar 11, similar to the collar 7, which rests upon a series of antifriction-balls 12, seated in a socket-piece 13, supported on a bracket 14. The bracket 14 is formed with slots 15, through which extend adjusting-bolts 16, by means of which the bracket may be adjusted vertically to facilitate the mounting of the gate and to regulate its height above the ground. A suitable cover 17 may be placed upon the socket-piece 13, above the conical collar 11, to prevent the entrance of dust into said socket-piece. Rigidly mounted upon the upper end of the gate pivot member 5 is an arm 18, which is held in place by means of a nut 19, the upper end of a brace-rod 20 being interposed between the nut 19 and the rigid arm 18. Pivotally connected to the outer end of the rigid arm 18, by means of a bolt 21 and spacing-nut 22, is a link 23, which is angularly bent intermediate its ends in order that it may clear the nut 19 on the upper end of the gate pivot member 5 as the gate is swung open or closed. The link 23 is connected with two coil-springs 24, which are attached at different points to a yoke 25, formed with a downwardly-extending integral arm 26, which is attached to the gate-post 1 by means of the bolts 16.

Fastened upon one side of the gate in any suitable manner is a transversely-extending arm 29, which is formed at its outer end with an eye 30, in which is hooked one end of a link 31. Extending through an eye 32 in the upper end of the link 31 is a draw-rod 33, which is connected in any suitable manner to a draw-rod 34. The draw-rod 34 is connected with a pivotally-mounted gate-latch 35, which coöperates with a catch 36 upon the gate-post 2 to lock the gate in closed position. A spiral spring 37, attached at one end to the gate-latch and at the other end to a cross-bar 38 of the gate, is provided normally to maintain the gate-latch in locked position. Connected with the short draw-rod 33 is a chain or other flexible element 39, which in turn is attached to a lever 40, pivoted upon an upright 41 and provided at its opposite end with an operating-handle 42. Fastened upon the upright 41 is a catch 43, which is adapted to be engaged by the gate-latch 35 when the gate is in open position.

Upon the side of the gate opposite to the transversely-extending arm 29 is a rearwardly-extending angular arm 44, which terminates at a point beyond the pivot-point of the gate. Loosely connected to the end of the rearwardly-extending angular arm 44 is an eye member 45, to which is attached a chain or other suitable flexible element 46, connected in turn with a lever 47, mounted upon an upright 48 and provided with a handle 49. The eye member 45 is also connected with a draw-rod 50, which in turn is connected with the gate-latch 35, as shown in Fig. 1.

When the handle 42 is drawn down, the draw-rod 34 is operated, through the lever 40, chain 39, and draw-rod 33, to unlock the gate-latch 35. The continued pull upon the handle 42 causes the gate to open partially until the coil-springs 24, pulling upon the rigid arm 18 from a different direction, caused by the movement or displacement of said arm across a predetermined center by the partial opening of the gate, causes the gate to be opened entirely. In like manner a second pull upon the handle 42 causes the latch 35 to be unhooked from the catch 43 of the upright 41 and the gate to be partially closed, such action moving the rigid arm 18 on the upper end of the pivot member of the gate across its center until the coil-springs 24 exert their influence entirely to close the gate.

The operation of the lever 47 and handle 49 is the same as that described with respect to the lever 40 and handle 42. The initial pull upon the handle 49 causes the gate to be unlatched and to spring partially open, whereby the springs 24 are caused to complete the opening movement of the gate, said gate being closed by a similar downward pull upon the handle 49 or upon the opposite handle 42, causing the gate to close, as described.

In its novel combination and arrangement of parts and in its details of construction the device of this invention presents an improvement over prior devices of a similar character.

Having thus described the invention, what is claimed is—

1. A gate having a transversely-extending arm on one side, a rearwardly-extending arm upon the opposite side terminating beyond the pivot-point of the gate, operating means connected with each of said arms, and automatic means adapted, when the gate is partially opened or partially closed, to open it entirely or to close it entirely.

2. A gate having a transversely-extending arm on one side and a rearwardly-extending arm on the opposite side terminating beyond the pivot-point of the gate, a latch upon the gate, a plurality of draw-rods connected with the latch, one of the draw-rods being loosely connected with one of the arms, and the other draw-rod being loosely connected with the other arm, manually-operated means connected with each of the draw-rods, and automatic means adapted, when the gate is partially opened or partially closed, to open it entirely or to close it entirely.

3. A gate having a rigid arm, a link pivotally connected with the rigid arm, a plurality of coil-springs connected with the link, and means for partially opening or partially closing the gate.

4. The combination of a gate-post, a yoke connected thereto, a rigid arm upon the gate, a link pivotally connected with the arm, a plurality of coil-springs attached to the link and to different points of the yoke, a transversely-extending arm on one side of the gate, a rearwardly-extending arm on the opposite side thereof terminating beyond the pivot-point of the gate, a flexible element connected with each of the last-named arms, a lever connected with each of the flexible elements, and a handle connected with each of the levers.

5. The combination of a gate-post, a strip attached thereto and formed with a socket-piece at one end, antifriction-balls in the socket-piece, a gate having a pivot member stepped in the socket-piece, and provided with a collar resting upon the antifriction-balls, a bracket vertically adjustable upon the strip and having a socket-piece provided with antifriction-balls, a second collar upon the gate pivot member resting on the last-named balls, an arm rigidly mounted upon the upper end of the gate pivot member, a link pivotally connected with the rigid arm, a yoke having a downwardly-extending arm attached to the gate-post, a plurality of coil-springs attached at different points to the yoke and connected with the link, a transversely-extending arm on one side of the gate, a rearwardly-extending arm on the opposite side thereon terminating beyond the pivot-point of the gate, a draw-rod loosely connected with each of the last-mentioned arms, a gate-latch connected with each of the draw-rods, a lever for operating each of the draw-rods, and a handle for operating each of the levers.

6. A gate having arms on opposite sides thereof, one of said arms terminating beyond the pivot-point of the gate, operating means connected with each of the arms, and automatic means adapted when the gate is partially opened or partially closed, to open it entirely or to close it entirely.

In testimony whereof I affix my signature in presence of two witnesses.

VANNY W. RADCLIFF.

Witnesses:
 E. A. MURPHY,
 GEORGE RATCLIFF.